March 11, 1941.                L. J. CALDOR                2,234,464
                            COFFEE BREWING DEVICE
                              Filed Nov. 1, 1939
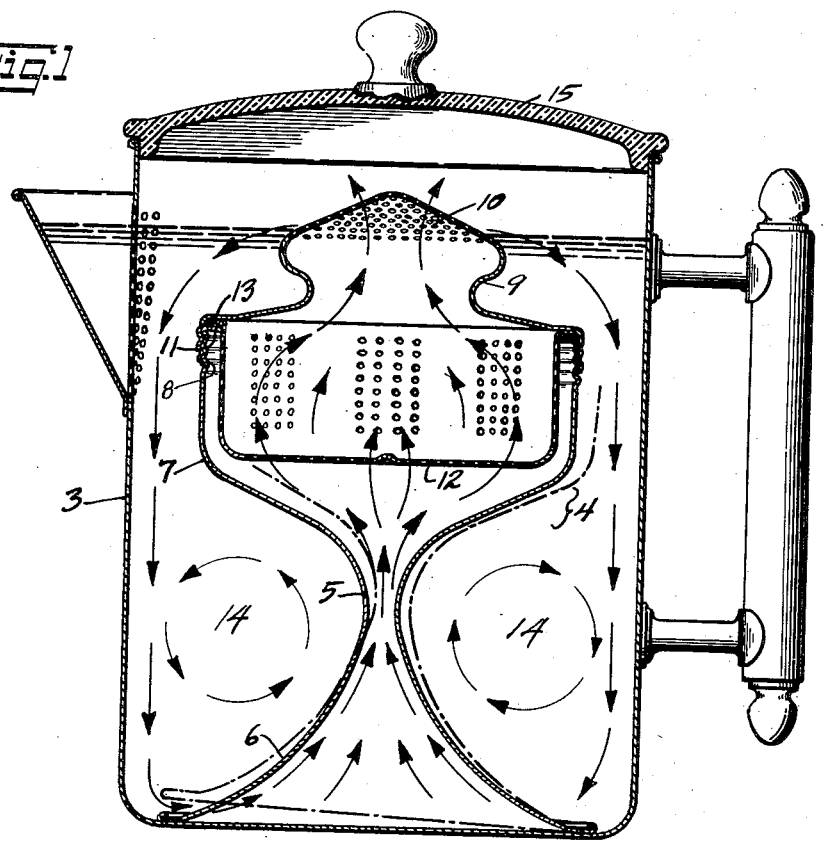
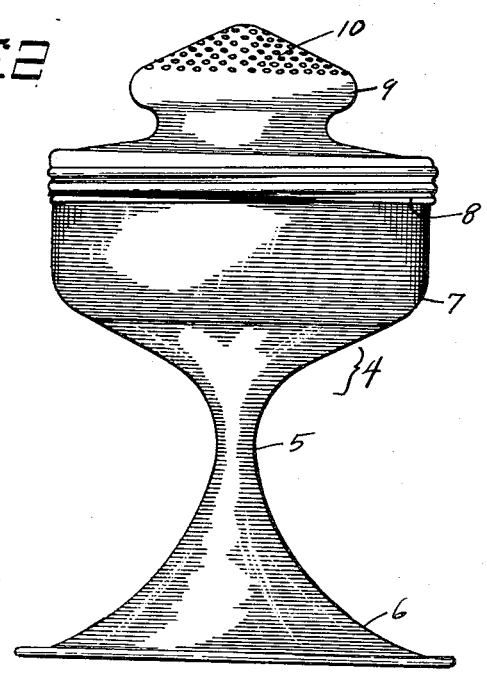
INVENTOR
Louis J. Caldor
BY
Emanuel Scheyer
ATTORNEY Patented Mar. 11, 1941

2,234,464

UNITED STATES PATENT OFFICE 2,234,464

COFFEE BREWING DEVICE

Louis J. Caldor, New York, N. Y.

Application November 1, 1939, Serial No. 302,268

6 Claims. (Cl. 53—3)

This invention relates to a coffee brewing device suitable for placing in most any pot of suitable dimensions. While preferably closed, an open pot may be used. It consists essentially of a vessel open at its base and having substantially an hour glass shape, the base resting on the bottom of the pot and being flared out so that it covers practically the whole area of the bottom which is subjected to heat. The upper part of the vessel supports a perforated container which is used to hold the coffee grounds. The water heated at the base of the vessel rises up through its narrow part into its upper wider part and through the coffee grounds held in the container, passing out from the vessel through its perforated top into the pot outside of the vessel returning as it cools to the lower portion of the pot. The boiling of the water in the bottom of the vessel generates steam which on its way upward through the vessel meets the resistance to its passage of the narrow portion of the vessel and its passage through the grounds resulting in a lifting or tilting action being given to the vessel. When the pressure thus generated is relieved by the water and steam passing out of the top of the vessel, the latter settles back again on the bottom of the pot. This is repeated at frequent intervals resulting in a dancing or chattering of the vessel as the water and steam escape from the top and the cooler water enters under the bottom edge of the vessel.

The action of my device differs from those of the prior art in that the boiling water and steam pass up through the vessel directly through the grounds, the water then flowing down to cooler regions in the pot outside the vessel, and entering the vessel again through its open base for further circulation through the grounds. The construction and operation of the device is such that only a small amount of water is brought to a boil at any time and only this part of the liquid is brought into direct contact with the coffee grounds and then forcibly circulated away from it to a relatively cooler region. As a result, over boiling of the greatest part of the liquid, and partly finished beverage is minimized. Because only a small amount of water is brought to a boil at any time there is rapid and substantially immediate action of the hot water on the coffee. The passage of the water and steam up through the coffee grounds agitates them preventing settling and packing promoting better extraction. Further, the chattering of the vessel as the steam and water escape and new liquid enters under its bottom edges keeps the grounds agitated increasing their motility and spacing.

With my construction, the contact of the water with the grounds takes place with the water continually in its most active state which is then immediately removed to a cooler region. In the prior art device commonly known as a "percolator" the water is deflected through an air space to drop down upon the grounds. The passage of the water through the air space has a cooling effect on the water.

My device is strong because of its shape and is easily cleaned because of its simple construction.

While coffee and grounds are referred to as the material from which the extraction or infusion is to be made, I wish it to be understood, that both in the description and claims these terms are intended to be broad enough to cover other suitable materials such as tea leaves, coffee substitutes or the like.

Other objects and advantages will become apparent upon further study of the description and drawing in which:

Fig. 1 is a section through the device and a pot in which it is set, and

Fig. 2 is an elevation of the device shown by itself.

Pot 3 has set therein a sheet metal member denoted in its entirety by the numeral 4. The pot is closed by a lid 15. Member 4 is preferably given an hour glass-shape with a constricted portion 5, a flared out bottom portion 6 and a flared out upper portion 7. Bottom portion 6 is open at its bottom, being wide enough at the latter to cover substantially all of that part of the bottom of the pot which is subject to heat. In an ordinary coffee pot, practically the entire bottom of the pot is subjected to heat even when set on a gas or electric stove having burners of restricted area. On ordinary coal stoves, pots have their entire bottom subject to heat.

The top of the upper portion 7 is provided with a thread 8 upon which is screwed cap 9 having perforations 10 therein. The upper edge of portion 7 is provided with an inturned flange 11 upon which is set outwardly extending flange 13 of perforated container 12. When cap 9 is screwed on upper portion 7, flange 13 is pinched between flange 11 of portion 7 and said cap, rigidly supporting container 12 in a central position in portion 7. The diameter of the bottom of bottom portion 6 is greater than the diameter of upper portion 7 to ensure a clearance between the sides of the latter and the inside of the pot.

The coffee grounds, not shown, are placed in container 12 and the pot filled with water. Upon applying heat to the bottom of the vessel the water at the bottom of portion 6 is caused to boil. As the steam and water rise they enter the constricted area or portion 5 where their velocity is increased producing, it is believed, an injector effect. At the same time, it is further believed, the taper of portion 6 between its bottom and the constricted portion 5 provides an abutment against which the upward pressure of the generated steam reacts lifting member 4 when there is sufficient pressure. The resistance to the passage of water and steam through the grounds also produces a lifting effect. As member 4 lifts or tilts, water from the cooler regions 14 passes under the bottom edge of bottom portion 6 into the interior of said portion, the escape of steam and water from constricted portion 5 and out through perforations 10 reducing the pressure sufficiently to permit this. The water and steam pass up from constricted portion 5 into container 12, through the coffee grounds therein and out perforations 10 in cap 9, the water then passing down between the outside of upper portion 7 and the inside of pot 3 to the cooler regions 14. It is to be noted that the water and steam are brought into contact with the coffee grounds in their hottest condition and then forced away, the water moving to cooler regions. As the boiling goes on, member 4 repeatedly rises and falls giving rise to a circulation as noted above. The arrows indicate approximately said circulation. The rising or tilting and falling of member 4 is in effect a valve action, permitting the entrance of small quantities of water from time to time into the heated region. The dot and dash lines in Fig. 1 indicate partially the tilted position of member 4. As only a small quantity of water is subject to heat at a time, the device starts to brew coffee very shortly after the heat is applied.

I claim:

1. A coffee brewing device suitable for setting in a pot for boiling water, comprising, a vessel having a lower substantially inverted funnel-shaped portion open at the bottom, an upper basket shaped portion open at the top and flaring out from the narrow top of the lower portion, a container perforated on its bottom and sides for holding the coffee grounds, said container being supported in the upper portion over the narrow top of the lower portion, and a perforated cap closing off the upper portion above said container, said container being of less width than said upper portion, the top of the lower portion being located below the bottom of the container discharging its contents into said upper portion below said bottom, water and steam rising up through the vessel passing upward through the bottom of the container and laterally through the sides thereof through coffee grounds in the container leaving the vessel through said perforated cap, said device when set in a pot, resting freely on the bottom of the pot with the bottom of said lower portion serving as a base and having its inside diameter sufficiently large to cover substantially the bottom of the pot where subject to heat, the upper portion of the vessel being less diameter than the pot allowing clearance for the downward circulation outside the vessel to the bottom of the pot of the water leaving the perforated cap when water is boiled in the pot.

2. A coffee brewing device suitable for setting in a pot for boiling water comprising a substantially hour glass-shaped vessel open only at its top and bottom, a container perforated on its bottom and sides for holding the coffee grounds mounted in the upper portion of the vessel, said container being of less width than said upper portion and a perforated cap for covering the top of said vessel, said device when set in a pot resting freely on the bottom of the pot without substantial clearance between the bottom edge of said vessel and the pot, the inside diameter of the vessel at its bottom being sufficiently large to cover substantially the bottom of the pot where subject to heat, the upper portion of the vessel being of less diameter than its lower portion allowing clearance between said vessel and the pot for the downward circulation of water leaving the perforated cap when water is boiled in the pot, steam being generated and water heated at the bottom of said vessel rising up therein passing through the sides and bottom of the container and through the coffee grounds and out the perforated cap, said vessel lifting at intervals admitting water thereby into said vessel under its bottom edge.

3. A coffee brewing device suitable for setting in a pot for boiling water comprising a vessel open at the top and the bottom, a perforated container for holding coffee grounds mounted in the vessel near its top, said container extending substantially across the entire width of the vessel at its top, and a perforated cap closing off the top of said vessel and container, said cap being removably attached to the upper part of the vessel and when so attached holding the container to the vessel, said device when set in a pot having said vessel resting freely on the bottom of the pot, the inside diameter of said vessel at the bottom being sufficiently large to cover substantially the bottom of the pot where subject to heat, steam and water at the bottom of the pot, when water is boiled therein, rising up through said vessel passing up through the coffee grounds and out the perforated cap, said vessel lifting at intervals due to the boiling, admitting water thereby under its bottom edge.

4. A coffee brewing device suitable for setting in a pot for boiling water comprising a vessel open at the top and the bottom, a perforated container for holding coffee grounds having a flange at its top extending radially outward therefrom the upper edge of said vessel having a flange extending radially inward therefrom, the flange of the container being set on the flange of the vessel when the container is mounted therein, the upper portion of the vessel substantially adjacent its flange being threaded, and a perforated cap threaded at its lower portion to engage the thread on the vessel, said cap having a radially inturned portion engaging the flange of the container when the cap is screwed on the vessel for clamping the container in its position in the vessel, said device when set in a pot having said vessel resting freely on the bottom of the pot, the inside diameter of said vessel at the bottom being sufficiently large to cover substantially the bottom of the pot where subject to heat, steam and water at the bottom of the pot, when water is boiled therein, rising up through said vessel passing up through the coffee grounds and out the perforated cap, said vessel lifting at intervals due to the boiling, admitting water thereby under its bottom edge.

5. A coffee brewing device suitable for setting in a pot for boiling water, comprising a vessel open to flow of fluid through its bottom and top, a container for holding the coffee grounds, said container being perforated on its bottom and sides and permitting flow out its top, said container being supported in the upper portion of the vessel with space between its sides and the vessel, means for closing off the top of said space, water and steam rising up through the vessel passing upward through the bottom of the container and into said space and through the sides of the container, through the coffee grounds and out the top of the vessel, a perforated top located above the coffee grounds preventing their leaving the vessel, said vessel when set in the pot resting freely on the bottom of the pot, the bottom of the vessel being sufficiently large to cover substantially the bottom of the pot where subject to heat, the upper portion of the vessel being smaller than the pot allowing clearance for the downward circulation outside the vessel to the bottom of the pot of the water leaving said perforated top when water is boiled in the pot.

6. A coffee brewing device suitable for setting in a pot for boiling water comprising a vessel open to flow of fluid through its bottom and top, a container for holding the coffee grounds, said container being perforated on its bottom and sides and permitting flow out its top, said container being supported inside the vessel and being of less width than the portion of the vessel within which it is set, a perforated top located above the coffee grounds preventing their leaving the vessel, said vessel when set in the pot resting freely on the bottom of the pot, the bottom of the vessel being sufficiently large to cover substantially the bottom of the pot where subject to heat, the upper portion of the vessel being smaller than the pot allowing clearance for the downward circulation of water leaving the top of the vessel, steam generated and water heated at the bottom of said vessel when water is boiled in the pot, rising up in the vessel, passing through the sides and bottom of the container and through the coffee grounds and out said top, said vessel lifting at intervals admitting water thereby into said vessel under its bottom edge.

LOUIS J. CALDOR.